United States Patent
Weiberle et al.

(10) Patent No.: US 7,907,085 B2
(45) Date of Patent: Mar. 15, 2011

(54) METHOD FOR INCREASING THE INFORMATION DENSITY IN SIGNAL-TRANSMISSION LINES

(75) Inventors: Peter Weiberle, Sachsenheim (DE);
Claus Bischoff, Markgroeningen (DE);
Martin Gerhaeusser, Cleebronn (DE);
Steffen Hauefelein, Crailsheim (DE)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 11/644,754

(22) Filed: Dec. 22, 2006

(65) Prior Publication Data
US 2007/0177321 A1    Aug. 2, 2007

(30) Foreign Application Priority Data
Dec. 23, 2005  (DE) .................. 10 2005 061 865

(51) Int. Cl.
*G01S 13/00*    (2006.01)
(52) U.S. Cl. ........................................... 342/175
(58) Field of Classification Search ........... 342/175
See application file for complete search history.

(56) References Cited

U.S. PATENT DOCUMENTS

| | | | | |
|---|---|---|---|---|
| 4,379,238 A * | 4/1983 | Minakuchi | ............ | 327/107 |
| 5,442,796 A * | 8/1995 | Zastrow et al. | ............ | 712/36 |
| 6,014,176 A * | 1/2000 | Nayebi et al. | ............ | 348/539 |
| 2002/0154294 A1* | 10/2002 | Hedges et al. | ............ | 356/141.4 |
| 2003/0091343 A1* | 5/2003 | Chen et al. | ............ | 388/800 |
| 2003/0174523 A1* | 9/2003 | Minatani | ............ | 363/50 |
| 2004/0052101 A1* | 3/2004 | Maejima et al. | ............ | 363/127 |
| 2004/0139815 A1* | 7/2004 | Shimamura et al. | ............ | 74/335 |
| 2005/0057211 A1* | 3/2005 | Roepke | ............ | 318/808 |

FOREIGN PATENT DOCUMENTS
DE    10 2004 024 954    12/2005

\* cited by examiner

*Primary Examiner* — Thomas H Tarcza
*Assistant Examiner* — Timothy A Brainard
(74) *Attorney, Agent, or Firm* — Kenyon & Kenyon LLP

(57) ABSTRACT

A method for increasing the information density on a signal-transmission line. The signal-transmission line extends from a sensor to a control unit. A modulated signal, which includes a digital signal, is transmitted on the signal-transmission line. The digital signal assumes either a high level or a low level. The modulated signal includes an encoded pulse signal, which is superimposed on the digital signal and has both an encoded pulse duration and a variable pulse frequency.

12 Claims, 2 Drawing Sheets

METHOD FOR INCREASING THE INFORMATION DENSITY IN SIGNAL-TRANSMISSION LINES

BACKGROUND INFORMATION

In automatic transmissions, which are increasingly being used in motor vehicles, sensors are used which transmit more than one information item. One example is the engine-speed sensor, which measures both the rotational speed and the direction of rotation. The measured information items may be transmitted to a control unit via digital signals, e.g., via a bit code, or via analog signals, thus, e.g., using the ratio of signal voltage to sensor supply voltage. In order to achieve a high degree of transmission reliability, PWM (pulse-width-modulation) interfaces are increasingly being used. In the case of these, the ratio of the pulse width, also known as the pulse duration, and the signal period, also known as the period, is evaluated. However, PWM interfaces have the disadvantage that only information items regarding one physical variable can be transmitted. It is not possible to transmit independent variables via PWM interfaces.

A sensor for a transmission control system of, in particular, a motor vehicle is described in German Patent No. DE 10 2004 024 954. The sensor is connectible to a supply voltage $V_S$ and to ground GND, the sensor generating a signal voltage $V_{out}$. The signal voltage can assume two signals, namely HIGH and LOW, the two signals HIGH and LOW differing from supply voltage $V_S$ and from ground GND. The two signals HIGH and LOW take the form of, in particular, pulse-width-modulated signals.

SUMMARY OF THE INVENTION

The method provided by the present invention allows the information density of information transmitted on a signal line to be increased, where, in particular, a plurality of independent information items may be transmitted via one and the same line. The provided method advantageously ensures the separate, further processing or demodulation of the individual signals with the aid of simple evaluation circuits. In this context, the principle-based advantages of PWM signal transmission, such as short-circuit detection, are maintained.

The present invention provides that a digital signal, whose high level is defined by the supply voltage and whose low level is defined by the sensor ground, be superposed with an encoded pulse signal. The pulse signals advantageously have the characteristic that these may be separated from the digital signal within the framework of signal decoding, e.g., by a simple R/C element; that is, they may be filtered out in a simple manner. The two information items, that of the digital signal and that of the pulse signal, may be evaluated concurrently to this, using a processor having appropriate software functionality.

The superposition of a digital signal with an encoded pulse signal, which has defined pulse widths and a variable pulse frequency, allows, for example, the following information to be transmitted on one and the same signal line:

Regarding the digital signal, the digital information item 0 or 1 may be transmitted via its level, i.e., either high level or low level. The encoded pulse signal superimposed on the digital signal may be used for transmitting the following information: the presence of an encoded pulse signal constitutes an information item regarding the fact that no short circuit has occurred. This originates from the presence of the superposed pulse signal alone. If no pulses are transmitted, but a high level is present with regard to the encoded pulse signal, then a short circuit is present for powering the sensor, i.e., for providing a supply voltage. If no pulses are detected with regard to the encoded pulse signal and a low level is present with regard to the encoded pulse signal, then a short circuit to ground has occurred. An additional, digital information item may be transmitted via a change in pulse width, i.e., the occurrence of a pulse-width change. If the pulse widths do not change, then, for example, it may be deduced that the sensor has a defect.

If variably stepped pulse widths are generated by the pulse generator for the encoded pulse signal, an encoded, digital information item is produced. Thus, for the sake of example, pulse widths of 50 μs, 100 μs, 150 μs, and 200 μs; i.e., a total of four levels may be permitted. Consequently, information regarding correct operation of the sensor, and an additional, digital information item regarding, for example, a specific temperature value, may be transmitted in an encoded manner via the pulse width and pulse train.

If, for example, a change in pulse width is present, e.g. pulse x is 50 μs, pulse x+1 is 100 μs, pulse x+2 is 50 μs, and pulse x+3 is 100 μs, then it may be deduced that the sensor is operating correctly, and an additional digital information item, e.g. regarding a particular temperature range, may be transmitted. A change in pulse width is present in another example, pulse x being 50 μs, pulse x+1 being 200 μs, pulse x+2 being 50 μs, and pulse x+3 being 200 μs again; thus, it may be inferred that the sensor is operating correctly, and, for example, an additional digital information item indicating that the temperature is greater than a specific value may be acquired.

A further information item evaluable within the scope of pulse-width modulation is present via the pulse frequency, at which the encoded pulse signal is generated.

A further advantageous characteristic of the provided superposition of a digital signal and an encoded pulse signal is that the carrier signal of the encoded pulse signal is a digital signal. Information, in particular regarding the ratio of defined pulse width or pulse duration to period, may be transmitted via the pulse frequency of the encoded pulse signal.

The filtering, i.e. the separation of the digital signal and the encoded pulse signal superimposed on it, is implemented, for example, via a low pass filter, by which the digital signal, for the purpose of controlling hardware, is filtered out of the modulated signal, i.e. out of the digital signal and the encoded pulse signal superimposed on it. The modulated signal is concurrently evaluated in view of the carrier signal, e.g. by a processor, with regard to the pulse width of the encoded pulse signal and its pulse frequency. Using these signal information items, e.g., the position information may be calculated in the processor, which means that the positions of a selector lever for an automatic transmission of a motor vehicle may be detected.

DETAILED DESCRIPTION

Figure 1:
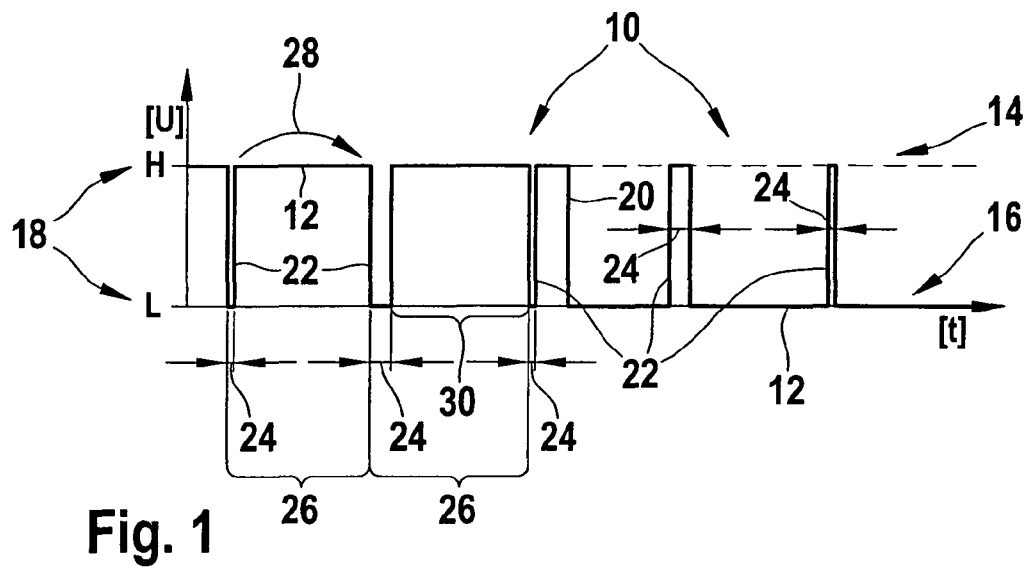
FIG. 1 shows a modulated signal provided by the present invention, including a digital signal and an additional, encoded pulse signal.

An exemplary embodiment of the modulated signal provided by the present invention, where a further, encoded pulse signal is superimposed on a digital carrier signal, may be taken from the representation of FIG. 1.

A modulated signal 10 provided by the present invention includes a digital signal 12 used as a carrier signal. Digital signal 12 may assume a level 18, which corresponds to either a high level 14 (H) or a low level 16 (L). Digital signal 12 of modulated signal 10, shown in FIG. 1, has a level change 20, at which high level 14 of digital signal 12 changes into low level 16. High level 14 corresponds to the level of the supply voltage, whereas low level 16 corresponds to the sensor ground.

Digital signal 12 is superimposed with an encoded pulse signal 22. Encoded pulse signal 22 includes individual pulses, which are generated at a predefined pulse frequency 26. The individual pulses are separated from each other by interpulse periods 30, which correspond to the time interval in which the individual pulses of encoded pulse signal 22 are generated by a pulse generator of a pulse-width generation system, not shown here in further detail. Pulse width 24 of the individual pulses of encoded pulse signal 22 may vary, as shown in FIG. 1.

According to this, modulated signal 10 includes digital signal 12 and encoded pulse signal 22. The presence of encoded pulse signal 22 allows the conclusion that no short-circuit has occurred, as will be described in the following in connection with FIGS. 2 and 3.

Specific level 18 of digital signal 12, i.e. the presence of high level 14 or the presence of low level 16, constitutes a digitally processable information item, which may be used in an evaluation stage 38 in order to evaluate the digital signal for controlling hardware.

Figure 2:
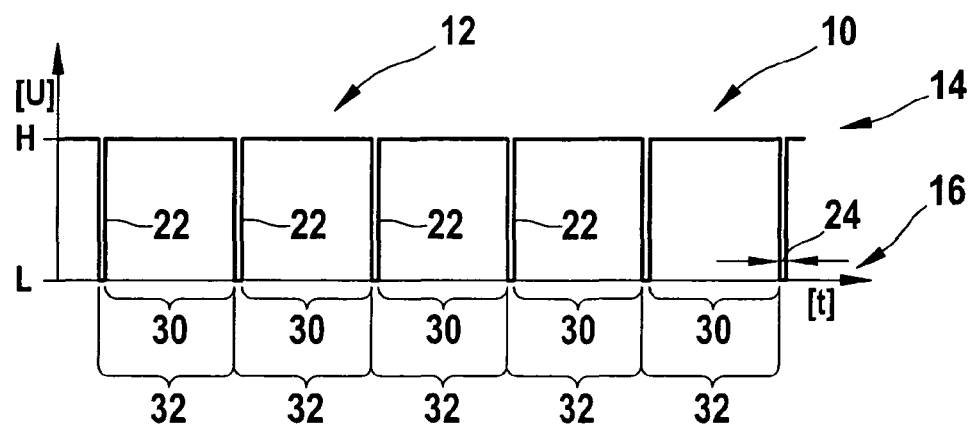
FIG. 2 shows a modulated signal of a digital signal, including an additional encoded, superposed pulse signal of a first pulse frequency.

FIG. 2 shows a modulated signal provided by the present invention, where a digital signal is superimposed with an encoded pulse signal having a specific pulse frequency.

In automatic transmissions of motor vehicles, a position sensor is used for sensing the selector-lever position. The position sensor provides the information items listed below and, if indicated, further ones for a transmission control unit and for the engine control unit: an information item regarding the current selector-lever position must be present. In addition, short-circuit monitoring is necessary, as well as a signal to that effect, which relates to self-monitoring of the sensor. Furthermore, a digital information item regarding the current position of the selector level, e.g. regarding positions P and N, must be present. A motor vehicle may only be started in selector-lever positions P and N. In order to take into account the circumstance that in some operating situations, the microprocessor in the control unit, needed for evaluating the position-sensor information, is not operational, it must be insured that the information item regarding the selector-lever positions P and N is pretty as a digital signal for hardware control.

If digital signal 12, which is shown in FIG. 1 and is used, for example, for position information regarding the selector lever for "P or N" or not "P or N," is superimposed with an encoded pulse signal 22, the information of the self-monitoring may be transmitted via the coding, and an exact information item regarding the selector-lever positions along its path of travel, such as P, Z1, R, Z2, N, Z3, D, Z4, 4, Z5, 3, Z6, 2, may be transmitted via the pulse frequency. In this connection, intermediate regions of the travel path of the selector lever, in which the selector lever does not assume any of selector-lever positions P, D, R, N, 4, 3, or 2, are referred to as Z1, Z2, Z3, Z4, Z5, or Z6. The intermediate regions referred to as Z1 through Z6 may also be detected, using pulse frequencies.

The output of encoded pulse signal 22 in itself supplies an information item regarding the short-circuit status. If no pulses are output and a high level is present with regard to encoded pulse signal 22, then a short-circuit to the sensor supply voltage may be inferred. If no pulses occur with regard to encoded pulse signal 22 and a low level 16 is present, then a short-circuit to sensor ground may be inferred. If alternatingly variable, defined pulse widths are output in the case of sequential pulses, then a digital information item may be obtained from this. In addition, further digital information, which may be evaluated in an evaluating processor 40 (cf. representation according to FIG. 4), may be included in pulse width 24 of the individual pulses of encoded pulse signal 22.

It may be gathered from the representation according to FIG. 2, that modulated signal 10 shown there includes digital signal 12, which constantly assumes high-level 14. This signal level includes, for example, the information that the selector lever of an automatic transmission is in positions "P or N."

Digital signal 12 assuming the high-level is superimposed with encoded pulse signal 22. This has a specific pulse frequency 32. According to the representation in FIG. 2, interpulse periods 30 set in as a function of this pulse frequency 32 from individual pulse to individual pulse of encoded pulse signal 22. The individual pulses of encoded pulse signal 22 of modulated signal 10 according to the representation in FIG. 2 have an identical pulse width 24. Pulse frequency 32 corresponds to a specific position, thus, for example, position P of the selector lever of an automatic transmission. This coding has the advantage that pulses having a constant pulse width 24 may be filtered out very easily. The position information of, for example, the selector lever with respect to position P and an additional, arbitrary position (cf. representation according to FIG. 3) may be included in the pulse frequency itself, as well as in the ratio of pulse duration to period. The last-mentioned option has the advantage that the signal transmission is not a function of the accuracy of the timing element. The digital information regarding selector-lever position "P or N" or not "P or N" is acquired by filtering out the individual pulses of encoded pulse signal 22 via a simple R/C element, as shown in FIG. 4.

Figure 3:
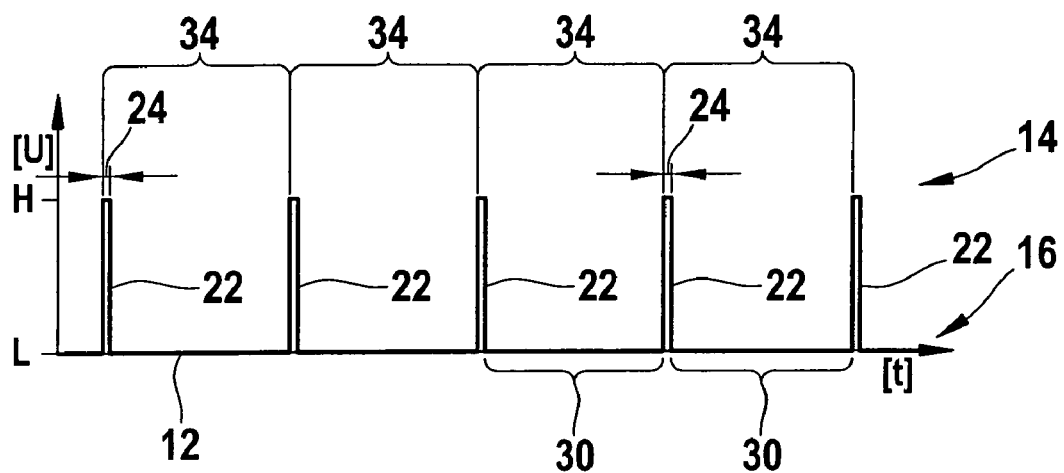
FIG. 3 shows a modulated signal, including a digital signal and an additional encoded, superposed pulse signal of a second pulse frequency.

FIG. 3 shows a modulated signal, which likewise includes a digital signal and a further pulse signal shown in another pulse frequency.

It can be gathered from the representation according to FIG. 3, that digital signal 12 of modulated signal 10 is constantly at low level 16 over time. In contrast to the representation of modulated signal 10 according to FIG. 2, the individual pulses of encoded pulse signal 22 according to the representation in FIG. 3 are spaced apart by interpulse periods 30, which are produced as a function of a different pulse frequency 34. A comparison of the individual pulses of encoded signals 22 according to FIGS. 2 and 3 indicates that the individual pulses of encoded pulse signal 22 according to the representation in FIG. 3 are spaced further apart in time, which occurs as a function of different, set pulse frequency 34. An evaluable information item regarding a further position, for instance selector-lever position R of an automatic transmission, forms the basis of this information item of the pulse frequency from individual pulse to individual pulse, in the present case, of other pulse frequency 34. This information may be filtered out in an evaluating processor shown in FIG. 4, irrespective of the carrier signal, i.e. in the present case, that of digital signal 12 having low level 16.

Figure 4:
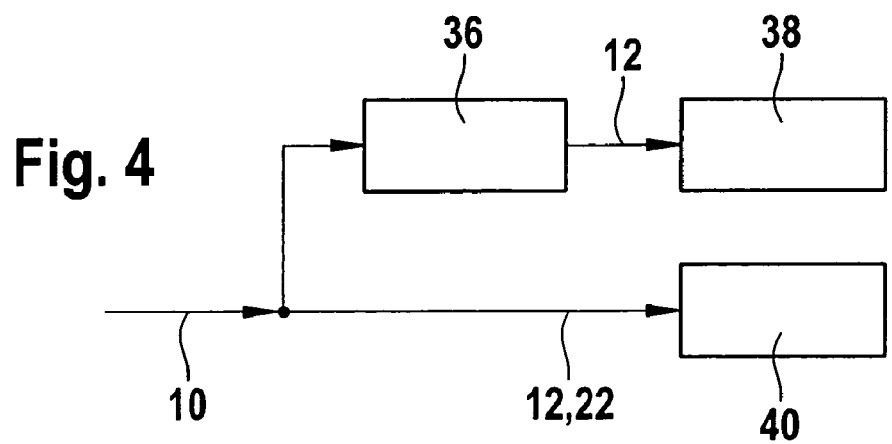
FIG. 4 shows a block diagram for evaluating the modulated signal.

A block diagram for separating the digital signal and the encoded pulse signal of the modulated signal, superimposed on it, according to FIGS. 1, 2, and 3, can be gathered from the representation of FIG. 4. Modulated signal 10 is fed to a low-pass filter 36, which evaluates (transmits) digital signal portion 12 of modulated signal 10 to an evaluation stage 38 for evaluating the digital signal with regard to its high level 14 or its low level 16. Hardware control (triggering) may take place as a function of level 18 of digital signal 12. Thus, for example, it is possible to enable the starting operation on the basis of level 18 of digital signal 12, when a selector-lever position "P or N" of the automatic transmission has been detected.

On the other side, modulated signal 10 is supplied to an evaluating processor 40. Inside evaluating processor 40, the modulation frequency of encoded pulse signal 22 is evaluated; thus, for example, determined pulse frequency 32 represented in FIG. 2 is evaluated, and different pulse frequency 34 represented in FIG. 3 is evaluated. Specific positions of the selector lever of an automatic transmission for a motor vehicle may be deduced from this (from the modulation frequency of the encoded pulse signal). Events may be triggered, or the occurrence of events may be suppressed, by pulse frequencies 32 or 34, as well as any other pulse frequencies, which correspond to specific positions. Self-monitoring of the sensor may be implemented by showing a change in the pulse widths of sequentially emitted pulses. If a change in pulse width is present, then the sensor is functioning correctly. If successive pulses having the same pulse width occur, then the sensor has a defect. Regarding the accuracy of the signal transmission, this may be considerably improved by calculating the ratio of pulse duration to period or pulse duration to pause time. Oscillators, which oscillate at a specific frequency, are used for generation of the encoded pulse signal, or for temporal control. This frequency has a tolerance and changes as a function of temperature and service life. The change in this frequency is relatively small in a limited time frame. Since both the pulse duration and the period are subject to the same frequency tolerance, the error may be nearly eliminated by calculating a ratio of the magnitudes.

What is claimed is:

1. A method, comprising:
    using a modulated signal which includes a digital signal that transitions between a high level and a low level, the modulated signal further including an encoded pulse signal superimposed on the digital signal such that the pulse signal is pulsed from the high level toward the low level when the digital signal is at the high level and the pulse signal is pulsed from the low level toward the high level when the digital signal is at the low level; and
    using a processor to monitor at least one of (a) pulse frequency and (b) pulse width of the pulse signal.

2. The method according to claim 1, further comprising:
    transmitting digital information items to an evaluation stage via the digital signal, in accordance with a level; and
    as a function of this, transmitting one of (a) information items regarding the presence of a short circuit to a supply voltage or to ground of a sensor, and (b) position information items, by the encoded signal to a processor.

3. The method according to claim 2, further comprising transmitting position information in the encoded pulse signal, via a pulse frequency of individual pulses.

4. The method according to claim 2, further comprising transmitting position information in the encoded pulse signal via a ratio of a pulse duration of an individual pulse to one of a pulse duration and a period.

5. The method according to claim 2, further comprising:
    deducing a short circuit to the supply voltage of the sensor in the event of no individual pulses and a persisting high level of the encoded pulse signal; and
    deducing a short circuit to the sensor ground in the event of no individual pulses and a persisting low level of the encoded pulse signal.

6. The method according to claim 1, further comprising transmitting an encoded digital information item to a processor via a pulse width of specific individual pulses of the encoded pulse signal.

7. The method according to claim 1, further comprising transmitting a digital information item to a processor via an occurrence of a pulse-width change in a pulse width of individual pulses of the encoded pulse signal.

8. The method according to claim 3, further comprising:
    detecting a first position of a selector lever corresponding to a P/N position of an automatic transmission of a motor vehicle via a specific pulse frequency of the encoded pulse signal; and
    detecting a second position of the selector lever corresponding to a R/D position of the automatic transmission of the motor vehicle via a different pulse frequency of the encoded pulse signal.

9. The method according to claim 3, further comprising detecting a defined position of a selector lever corresponding to occurring positions P through 2 of an automatic transmission of a motor vehicle via a specific pulse frequency of the encoded pulse signal.

10. The method according to claim 3, further comprising detecting an arbitrary position of a selector lever corresponding to a possible path of travel at an automatic transmission of a motor vehicle via a variable pulse frequency of the encoded pulse signal.

11. The method according to claim 2, further comprising:
    feeding the modulated signal to a low-pass filter, in which the digital signal is filtered out and transmitted to an evaluation stage for hardware control; and
    evaluating the modulated signal in an evaluating processor for an occurrence of a pulse-width change, a pulse width, and a pulse frequency.

12. The method according to claim 1, wherein the method is used for detecting a position of a selector lever, using a position sensor on an automatic transmission of a motor vehicle.

* * * * *